United States Patent [19]

Brandenburg, Jr.

[11] Patent Number: 5,848,473

[45] Date of Patent: Dec. 15, 1998

[54] SAW BLADE

[75] Inventor: Lloyd W. Brandenburg, Jr., Wausau, Wis.

[73] Assignee: Fiskars Inc., Madison, Wis.

[21] Appl. No.: 792,723

[22] Filed: Jan. 29, 1997

[51] Int. Cl.⁶ .................................................. B27B 21/00
[52] U.S. Cl. ................................ 30/514; 83/851; 83/852
[58] Field of Search .................................... 30/166.3, 355, 30/514; 83/835, 851, 852, 848, 846, 854

[56] References Cited

U.S. PATENT DOCUMENTS

| | | |
|---|---|---|
| 111,619 | 2/1871 | Disston et al. . |
| 378,203 | 2/1888 | Lohman . |
| 563,521 | 7/1896 | Walter . |
| 1,214,589 | 2/1917 | Rasmussen . |
| 1,793,171 | 2/1931 | Grant . |
| 2,035,262 | 3/1936 | Coleman ................................... 83/848 |
| 2,606,577 | 10/1952 | Derr . |
| 2,735,458 | 2/1956 | Buchmann . |
| 3,005,478 | 10/1961 | Laviano ................................... 83/846 |
| 3,477,479 | 11/1969 | Doty . |
| 3,837,024 | 9/1974 | Saunders . |
| 4,027,390 | 6/1977 | Kendzior . |
| 4,043,367 | 8/1977 | Knuth . |
| 4,179,967 | 12/1979 | Clark . |
| 4,265,285 | 5/1981 | Fodor . |
| 4,590,837 | 5/1986 | Nanba . |
| 4,627,165 | 12/1986 | Gibson . |
| 5,231,909 | 8/1993 | Hsu ....................................... 83/848 X |
| 5,263,257 | 11/1993 | Takigawa . |
| 5,361,665 | 11/1994 | Sonefors . |
| 5,477,763 | 12/1995 | Kullman ................................... 83/846 |
| 5,501,129 | 3/1996 | Armstrong et al. . |
| 5,606,900 | 3/1997 | Stoddard ................................... 83/846 |

*Primary Examiner*—Douglas D. Watts
*Attorney, Agent, or Firm*—Foley & Lardner

[57] ABSTRACT

A reciprocating saw blade comprises an elongated substantially flat body having a tang end and a distal tip end, a back edge and a spaced apart cutting edge. The cutting edge is formed of first and second pluralities of alternately and oppositely facing slicing teeth which define gullets formed therebetween. The first plurality of the slicing teeth extends from the one end and merges into the second plurality of the slicing teeth which extends to the other end. Each slicing tooth includes a slicing face facing one end, a planing face facing the other end, and a tip including an uppermost planar surface. The tips of the second plurality of teeth are substantially tangent to a first tooth tip tangent line. Each tip surface of the second plurality of teeth lies at a greater angle to the first tip tangent line than the tip surface of the first plurality of teeth. A method of making a reciprocating saw blade in accordance with the present invention is also disclosed.

42 Claims, 10 Drawing Sheets

SAW BLADE

FIELD OF THE INVENTION

The present invention relates generally to saw blades. More particularly, this invention pertains to saw blades in which the cutting teeth have particular configurations to reduce vibrations typically engendered by the cutting operation, and thereby improve feel and user comfort.

BACKGROUND OF THE INVENTION

In the field of hand and power reciprocating saws, it is known to design very aggressive saws (meaning saws that deeply penetrate with each stroke into the material being cut) utilizing slicing teeth each formed by three or more intersecting machined angled surfaces. Although these aggressive saws effectively cut through the material, the aggressive teeth design typically causes relatively high force spikes to occur during the low velocity region of each stroke (i.e., around the point of reversal of the reciprocating movement, and particularly during an initial portion of each cutting stroke). Such high force spikes may cause rough blade acceleration in the low velocity region, poor dynamic saw "feel", and may also reduce slicing efficiency.

In light of the foregoing, it appears desirable to provide a saw blade which can alleviate the problems associated with conventional items of that kind. That is, it seems desirable to provide a blade in which the teeth are configured to smooth out blade acceleration, particularly around the point of reversal of the reciprocating movement, to improve feel and comfort without materially impairing the effectiveness of the blade.

SUMMARY OF THE INVENTION

In accordance with one aspect of the present invention, a reciprocating saw blade comprises an elongated substantially flat metal body having a tang end and a distal tip end, a longitudinal back edge and a longitudinal cutting edge. The cutting edge includes a plurality of alternately and oppositely facing slicing teeth which define a plurality of gullets therebetween. Each slicing tooth includes a slicing face facing one end, a planing face facing the other end, and a tip including an uppermost essentially planar surface. A first plurality of the slicing teeth extend a predetermined distance from the one end toward the other end and a second plurality of the slicing teeth extend from the first plurality of teeth to the other end. The tips of the second plurality of teeth are substantially tangent to a first tooth tip tangent line. Each uppermost planar surface of the second plurality of teeth lies at an incline angle relative to the first tip tangent line, and each uppermost planar surface of the first plurality of teeth lies at a smaller angle relative to the tooth tip tangent line than each incline angle.

The present invention also includes a reciprocating saw comprising a handle and a blade. The blade includes a plurality of teeth designed for lower stroke velocities extending from one end of the blade toward the other end, and a plurality of teeth designed for relatively higher stroke velocities extending therefrom to the other end.

The present invention also includes a method of making a reciprocating saw blade. The method comprises the steps of forming slicing and planing faces on a plurality of high and low velocity slicing teeth. The method also includes the steps of forming a low velocity planar surface on each low velocity tooth and forming a high velocity planar surface on each high velocity tooth.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 1 is a right-side elevational view of a pull type saw in accordance with the present invention;

FIG. 1A is an elevational view of a fragment of an alternative tip end for the saw blade of FIG. 1;

FIGS. 5L–8L and 5R–8R are isometric views of the tip portion of the left and right teeth, respectively, of the saw blade of FIG. 4;

FIG. 9 is a schematic representation of a top view of the saw blade of FIG. 4;

DETAILED DESCRIPTION OF A PREFERRED EXEMPLARY EMBODIMENT

The present invention relates generally to saw blades having teeth with particular tip profiles to reduce the level of vibration imparted by the cutting action.

Figures 1, 1A, 5L, 5R, 6L, 6R, 7L, 7R, 8L, 8R, 9:
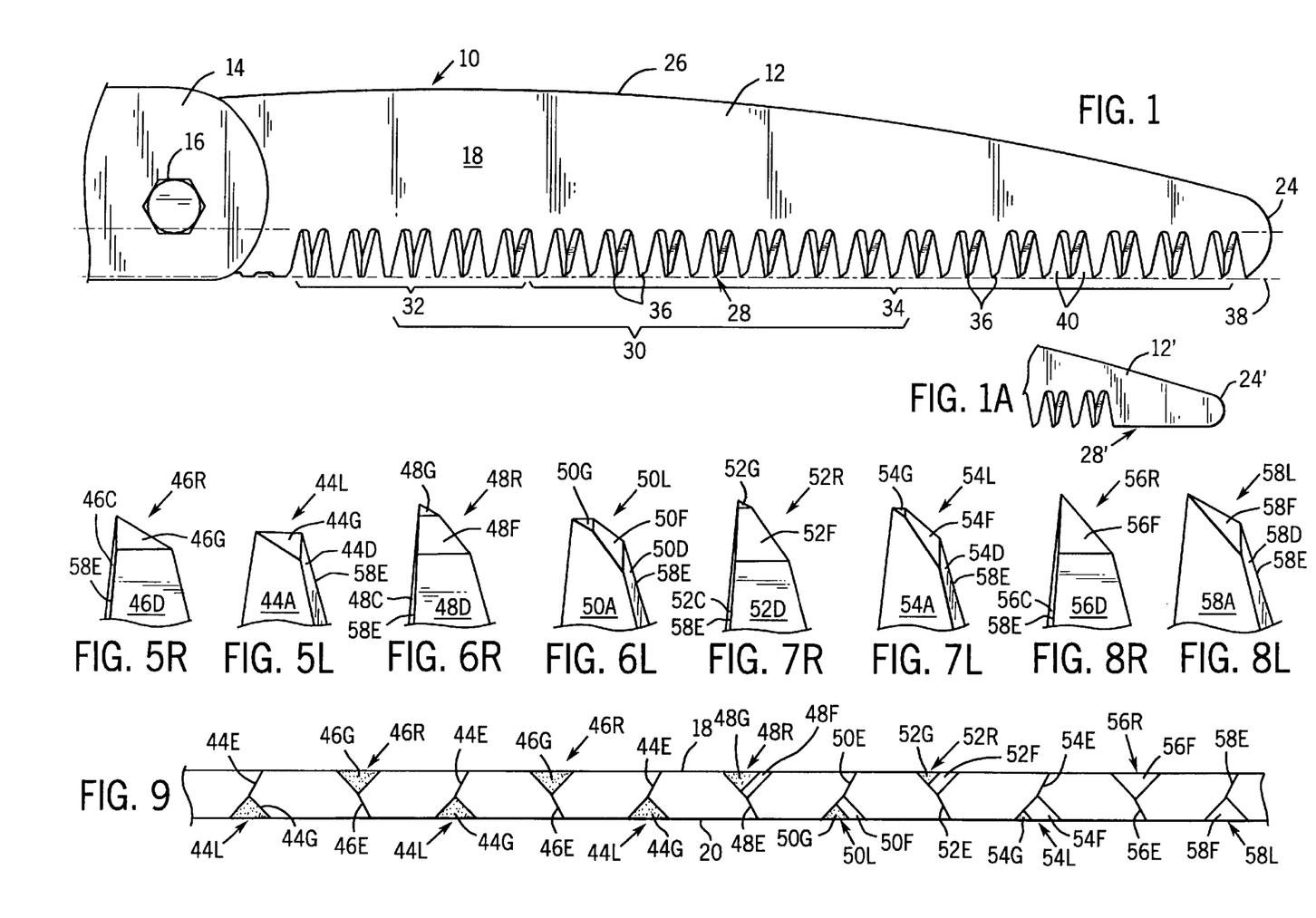
Figures 2, 3, 4:
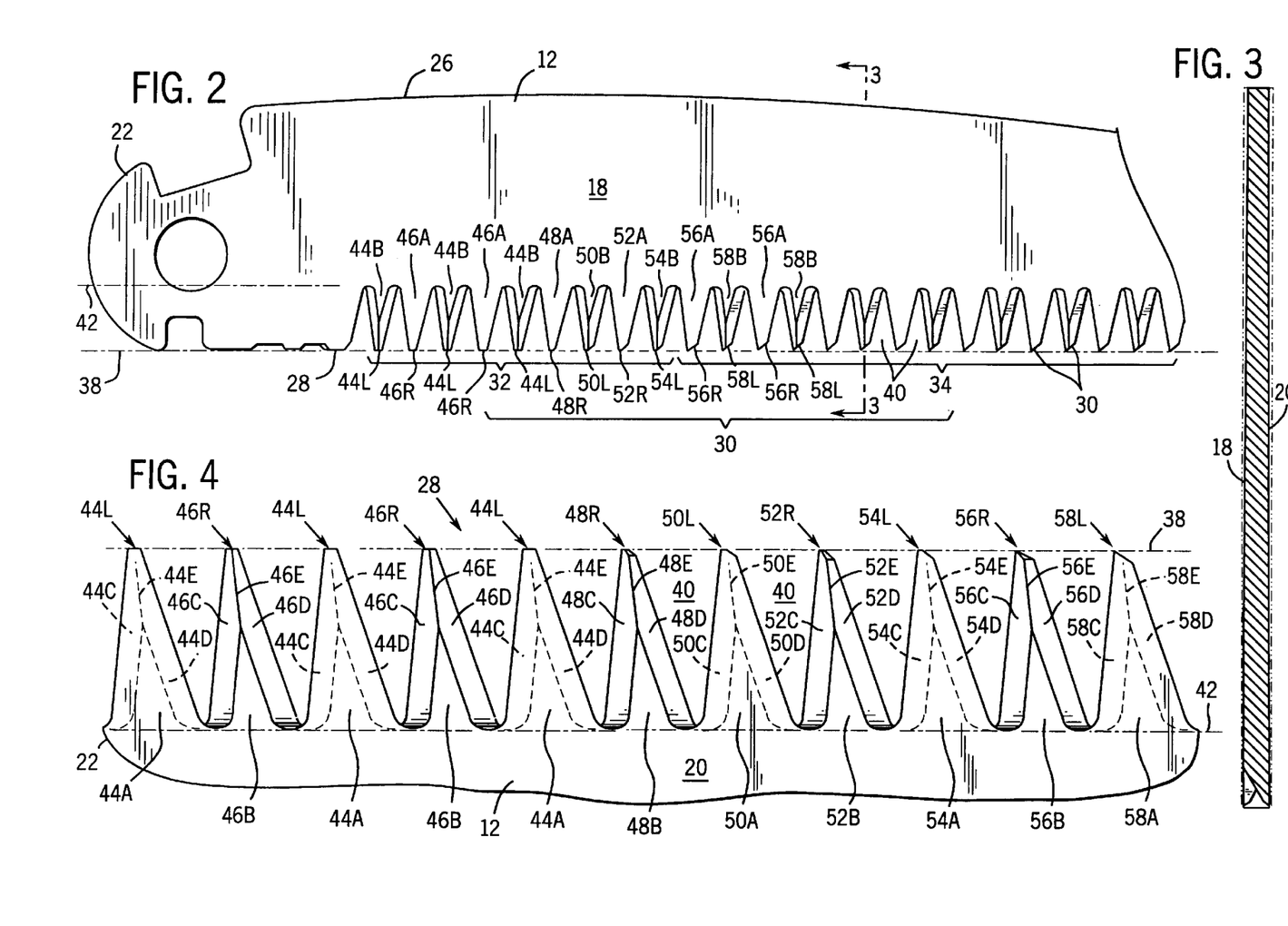
FIG. 2 is an enlarged elevational view of a fragment of the saw blade of FIG. 1.
FIG. 3 is a cross-sectional view of the saw blade of FIG. 2 taken along line 3—3 shown in FIG. 2.
FIG. 4 is an enlarged, left-side elevational view of a fragment of the saw blade of FIG. 2, with the blade shown in an inverted position.

Referring to FIGS. 1 and 2, a saw 10 for cutting wood or the like includes an elongated metal blade 12 to which a handle 14 is attached at one end by a bolt 16. Handle 14 may be a short grip or the end of a relatively long pole. Saw 10 is a pull type saw, meaning a pulling motion of blade 12 over and through the wood forms the primary slicing (or cutting) operation. However, as will be described below, during the return stroke (i.e., when pushing blade 12 back through the cut) the blade planes the sides of the cut, which results in a cleaner cut. Those skilled in the art will appreciate that the present invention could similarly be used with a push type saw (i.e., a saw in which the primary cutting action is produced by pushing the saw away from the user), simply by reversing the direction of the teeth.

Blade 12 has substantially planar right and left sides 18, 20, a tang end 22 opposite a distal tip end 24, and a longitudinal back edge 26 opposite a longitudinal cutting edge (or tooth edge) 28. As best shown in FIG. 5, right and left sides 18, 20 converge slightly toward one another from cutting edge 28 to back edge 26, which provides blade 12 with a friction reducing taper.

Cutting edge 28 includes a plurality of slicing teeth 30 grouped into a plurality of low stroke velocity teeth 32 and a plurality of high stroke velocity teeth 34. Low velocity teeth 32 extend a predetermined distance from tang end 22 toward tip end 24, and high velocity teeth 34 extend from low velocity teeth 32 to tip end 24. Thus, low velocity teeth 32 are positioned along cutting edge 28 for slicing the wood during a portion of the slicing stroke at which blade 12 is traveling relatively slowly (as explained further below with reference to FIGS. 22–25). Preferably, slicing teeth 30 are of substantially equal height and have tips 36 essentially tangent to a tooth tip tangent line 38. A gullet 40 is formed between each pair of adjacent slicing teeth 30, the bottom of each gullet 40 being substantially tangent to a tooth base tangent line 42. Tooth base tangent line 42 is conveniently substantially parallel with tooth tip tangent line 38. The gullets between low velocity teeth 32 preferably have a capacity for carrying cut material similar to the gullets between high velocity teeth 32.

Although not intending to be limiting in any way, some of the specific dimensions of saw 10 will now be discussed for purposes of illustration. Saw 10 is a wood saw in which slicing teeth 30 extend about 6 inches along cutting edge 28, each gullet 40 having a depth of about ¼ of an inch. The 9 teeth closest to tang end 22 constitute the low velocity teeth, while the remaining 22 teeth form the high velocity teeth. Accordingly, the low velocity teeth of a wood saw similar to saw 10 represent between about 15% and 35% of the total number of slicing teeth, and preferably about 25%.

However, the overall configuration of blade 12 in accordance with the present invention may vary depending on the application. For example, the proportion of low velocity teeth may vary depending on factors such as the application for which the saw is particularly designed, the kind of material to be cut, and whether the saw is a manual or power saw, just to name a few. In addition, for a push type saw the relative positions of the low velocity teeth and the high velocity teeth would of course be reversed. Furthermore, for a push-pull type cutting saw, low velocity teeth could be provided at both the tang and tip ends of the blade. Finally, in certain applications (for example, in tree pruner saws) wherein the saw is attached at the end of a long pole, a tip region 24' of a saw blade 12' may be formed without any teeth (see FIG. 1A). That is, tip region 24' provides blade 12' and a cutting edge 28' thereof with a non-serrated longitudinal extension. This "non-serrated" region (essentially a blanked edge) will assist the user, who will typically be standing a good distance away from the branch being cut, in keeping the blade within the cut. This in turn reduces the likelihood of accidentally bending the saw blade by abutting it against a branch or the like when attempting to re-engage the blade in the cut.

Referring now to FIGS. 4–9, low velocity teeth 32 and high velocity teeth 34 will be further described. When viewing these Figures, however, it should be kept in mind that blade 12 is shown in an orientation inverted from its normal use (and from the orientation in FIGS. 1–3), with the teeth being shown pointing upwardly to better illustrate teeth 32, 34. For similar reasons, blade 12 is shown schematically in FIG. 9, meaning some proportions may be exaggerated and some details omitted for purposes of illustration.

Low velocity teeth 32 comprise a series of alternating and oppositely facing left and right teeth 44L, 46R, 48R, 50L, 52R, and 54L (the designations L and R will be used herein to indicate whether the tooth extends primarily from the left or right side of the blade, respectively). Similarly, high velocity teeth 34 comprise a series of alternating and oppositely facing right teeth 56R and left teeth 58L.

Each right tooth 46R, 48R, 52R, 56R has a substantially triangular primary face 46A, 48A, 52A, 56A (see FIG. 2) which is essentially coplanar with right side 18 of blade 12. Right tooth 46R, 48R, 52R, 56R also has a smaller substantially triangular secondary face 46B, 48B, 52B, 56B (see FIG. 4) which is essentially coplanar with left side 20 of blade 12. In addition, each right tooth 46R, 48R, 52R, 56R has a pair of inclined faces (46C, 46D), (48C, 48D), (52C, 52D), (56C, 56D) which converge from triangular primary face 46A, 48A, 52A, 56A to triangular secondary face 46B, 48B, 52B, 56B and which intersect each other along an apex 46E, 48E, 52E, 56E. Inclined faces 46C, 48C, 52C, 56C form slicing faces which shave (or mill) wood from the sides and bottom of the cut during the pulling motion. Moreover, inclined faces 46D, 48D, 52D, 56D form planing faces which further smooth the cut during the pushing motion.

It is worth noting that blade 12 removes wood from a cut primarily by milling and planing, rather than by tearing or ripping as normally happens with conventional aggressive blades. This is a result of very accurate control of the micro sharpness of the slicing and planing faces (and particularly the micro radius along a slicing edge of each tooth formed by the intersection of each slicing face and the triangular primary face), as well as of the accurate tapering of the blade thickness. The resulting cut is thus very smooth and exhibits little material damage, more typical to a much less aggressive blade.

Similar but opposite to the right teeth described above, each left tooth 44L, 50L, 54L, 58L has a substantially triangular primary face 44A, 50A, 54A, 58A (see FIG. 4) which is essentially coplanar with left side 20 of blade 12 and a smaller substantially triangular secondary face 44B, 50B, 54B, 58B (see FIG. 2) which is essentially coplanar with right side 18 of blade 12. In addition, each left tooth 44L, 50L, 54L, 58L has a pair of inclined faces (44C, 44D), (50C, 50D), (54C, 54D), (58C, 58D) which converge from triangular primary face 44A, 50A, 54A, 58A to triangular secondary face 44B, 50B, 54B, 58B and which intersect each other along an apex 44E, 50E, 54E, 58E.

Figure 10:
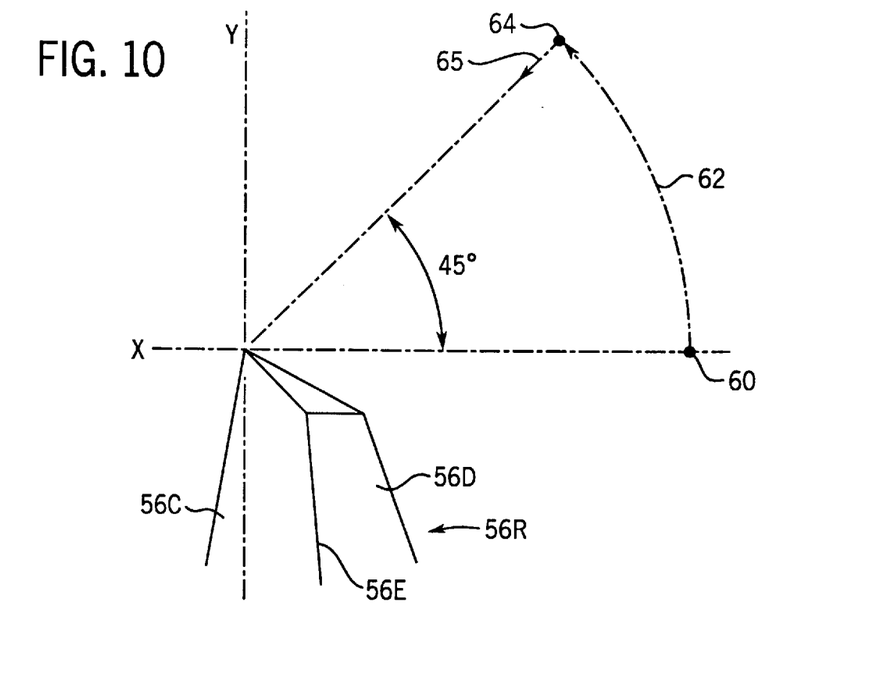
FIG. 10 is a left-side elevational view of a tooth relative to an X-Y coordinate system.
Figure 11:
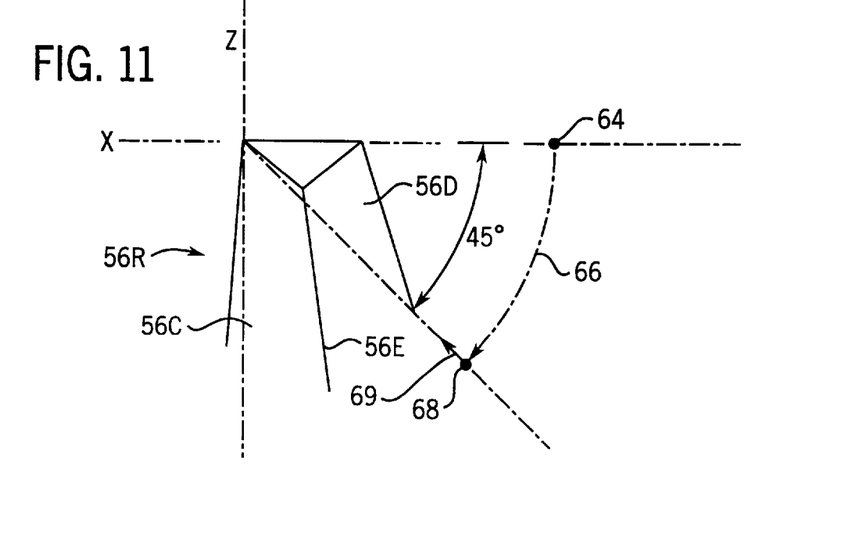
FIG. 11 is a top, left-side perspective view of the tooth of FIG. 10 relative to an X-Z coordinate system.

The detailed tip profiles of low and high velocity teeth 32, 34 are best understood by reference to the isometric views of FIGS. 5R–8L in combination with the schematic representation of FIG. 9. Of course, when viewing FIGS. 5R–8L, the vantage point from which the views are taken must be clear. To this end, FIGS. 10 and 11 illustrate a two step process for obtaining the proper viewing orientation. To begin, FIG. 10 shows an initial vantage point 60 in relation to a left side, elevational view of an outline of tooth 56R (i.e., the same orientation as in FIG. 4). From vantage point 60, the line of sight is elevated approximately 45° up from the horizontal X-axis (as indicated by phantom arrow 62), to an elevated vantage point 64 having a line of sight 65. From point 64, the line of sight is then rotated approximately 45° clockwise (i.e., out of the X-Y plane, as indicated by phantom arrow 66) to obtain a final top, left perspective vantage point 68 having a line of sight 69 from which the views shown in FIGS. 5R–8L are taken.

Referring back now to FIGS. 5R–8L and 9, each high velocity tooth 56R, 58L includes an upper most inclined face 56F, 58F which intersects each pair of inclined converging faces (56C, 56D), (58C, 58D) to angle each tooth 56R, 58L and form a high velocity triangular tip face thereon. Similarly, each low velocity tooth 44L, 46R includes an inclined face 44G, 46G which intersects each pair of inclined converging faces (44C, 44D), (46C, 46D) to angle each tooth 44L and 46R and form a low velocity triangular tip face thereon. Finally, each low velocity tooth 48R, 50L, 52R, 54L includes two inclined faces (48F, 48G), (50F, 50G), (52F, 52G), (54F, 54G) which together intersect each pair of inclined converging faces (48C, 48D), (50C, 50D), (52C, 52D), (54C, 54D) to angle each tooth 48R, 50L, 52R, 54L and form a low velocity triangular tip face thereon. Importantly, and as more fully described below, each inclined face 44G, 46G, 48G, 50G, 52G, 54G of low velocity teeth 32 is at a smaller angle from tooth tip tangent line 38 than is each inclined face 48F, 50F, 52F, 54F, 56F, 58F of low and high velocity teeth 32, 34. Stated differently, the "G" tooth tip faces are more flat or normal to the reciprocal sawing motion than the "F" tooth tip faces. Taken cumulatively, the "F" and the "G" faces form a tip on each tooth, with the "G" faces being an uppermost planar surface on the low velocity teeth and the "F" faces being an upper most planar surface on the high velocity teeth.

Figure 12:
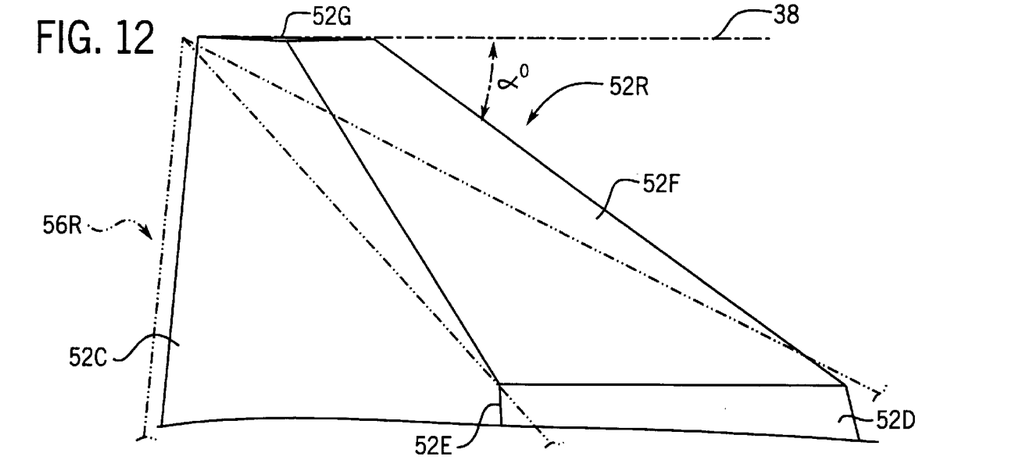
FIGS. 12–14 are enlarged, left-side elevational views of the angled tips of the teeth in accordance with the invention.
Figure 13:
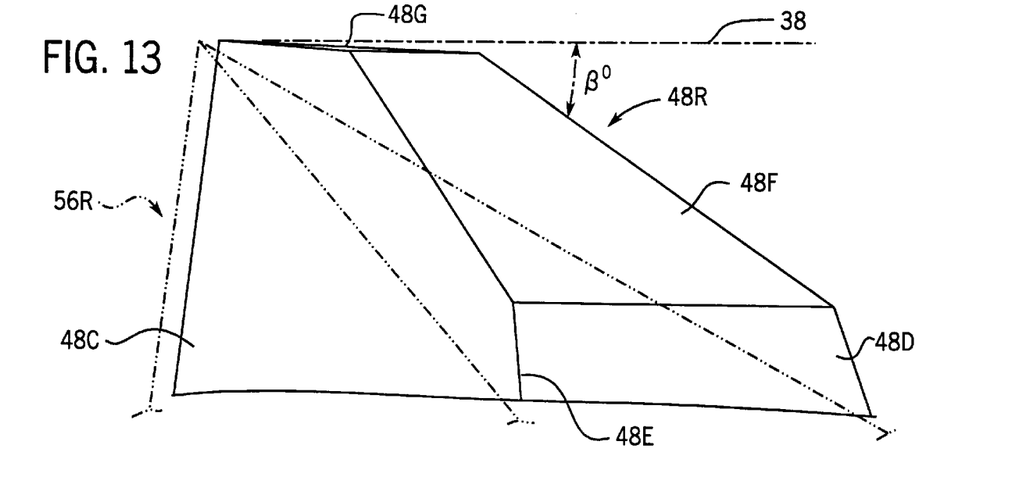
Figure 14:
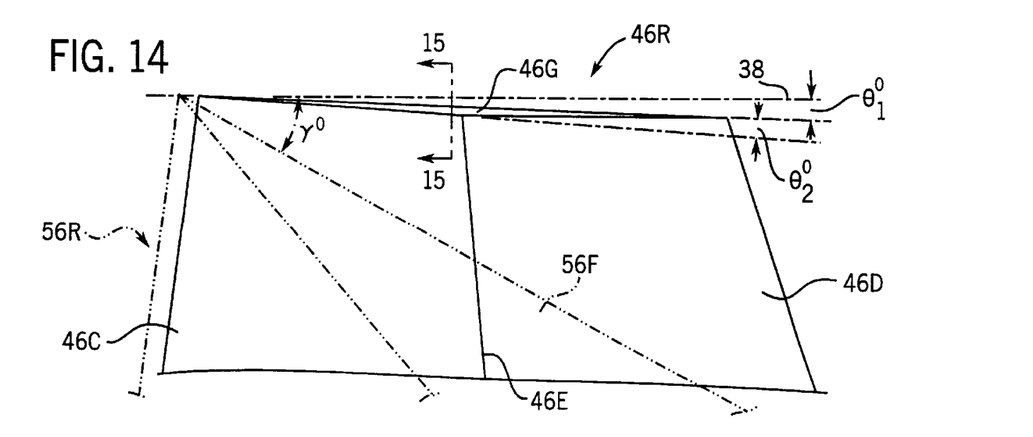

Turning now to FIGS. 12–14, the tip profiles of teeth 52R, 48R and 46R (the low velocity teeth) can be easily compared with the tip profile of tooth 56R (the high velocity teeth). Inclined face 52F is inclined at an angle $\alpha°$ from tangent line 38 (see FIG. 12), inclined face 48F is inclined at an angle $\beta°$ from tangent line 38 (see FIG. 13), and inclined face 56F is inclined at an angle $\tau°$ from tangent line 38 (see FIG. 14). Preferably, angle $\beta°$ (of face 48F) is less than angle $\alpha°$ (of face 52F), with the angles of remaining low velocity inclined faces 50F, 54F with respect to tangent line 38 preferably fitting in sequence (e.g., incline face 50F is preferably more horizontal than incline face 52F). Angle $\tau°$ (and the incline angles of the remaining high velocity "F" faces with respect to tangent line 38) is preferably somewhat less than incline angles $\alpha°$, $\beta°$ because the high velocity teeth lack the additional reinforcing thickness resulting from the relatively flat low velocity "G" faces. Incline angles $\alpha°$, $\beta°$ and $\tau°$ (and the incline angles for the remaining "F" faces) could all be the same, but preferably are between about 25° and 35° and have the above described relationships. Preferably, angle $\tau°$ is about 30° for the wood saw blade illustrated.

Figure 15:
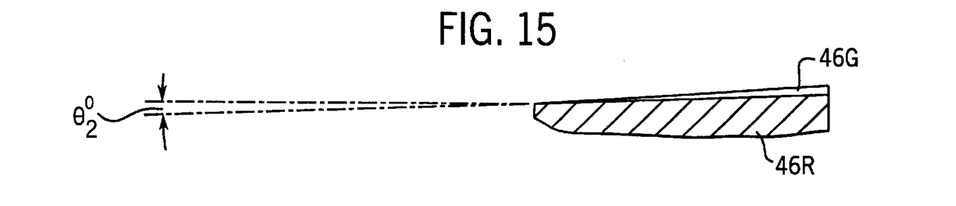
FIG. 15 is a cross-sectional view of a fragment of the tooth tip of FIG. 14 taken along the line 15—15 shown in FIG. 14.

As is clear from FIGS. 14 and 15, inclined faces 52G, 48G, 46G have smaller angles with respect to tooth tip tangent line 38 than the angles such as between inclined faces 52F, 48F, 56F with respect to tangent line 38 discussed above. Inclined faces 52G, 48G and 46G have an incline angle $\theta_1°$ with respect to tooth tip tangent line 38, and an incline angle $\theta_2°$ in a lateral direction. Incline angles $\theta_1°$ and $\theta_2°$ are much smaller than angles $\alpha°$, $\beta°$, $\tau°$, such as between about 0° and 5°, and preferably between about 1° and 2°. In the illustrated wood blade, angles $\theta_1°$ and $\theta_2°$ are about 2° each. Accordingly, inclined faces 52G, 48G and 46G form tooth penetration limiting triangular faces on low velocity teeth 52R, 48R and 46R. The left low velocity teeth 44L, 50L and 54L of course have similar tooth penetration limiting triangular faces.

Figure 16:
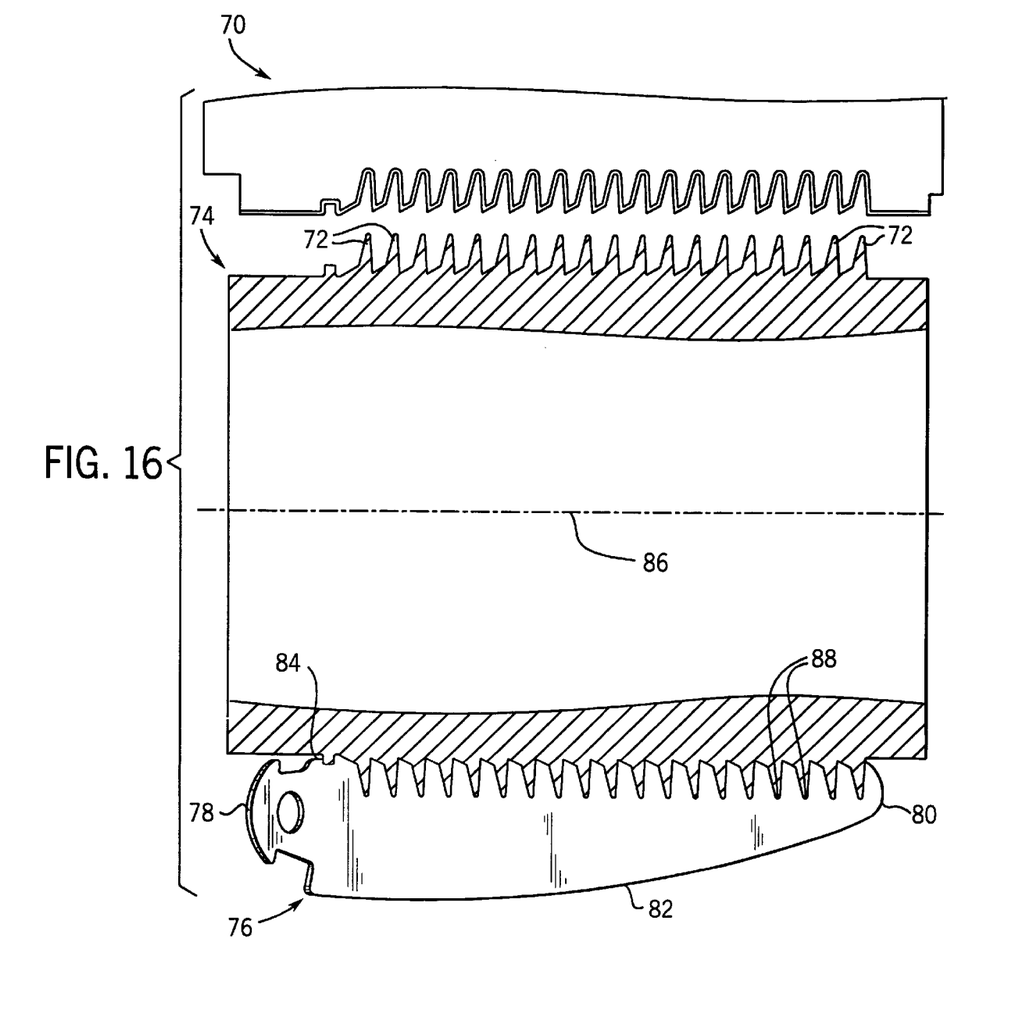
FIG. 16 is a diagrammatic representation of a method of making a saw blade in accordance with the invention.

Referring now to FIG. 16, a method of making saw blade 12 will now be described. Initially, a preformed diamond roll cutter 70 is used to form a plurality of profiled annular ridges 72 on a cylindrical grinding wheel 74. During the forming of ridges 72, diamond roll cutter 70 and grinding wheel 74 are maintained in relative rotation (in the same direction) with the surface speed of cutter 70 at 80% of the surface speed of grinding wheel 74. Grinding wheel 74 is preferably an $AlO_2$ vitrified grinding wheel.

A blank profile 76 (profile meaning essentially a perimeter of the blade prior to grinding the teeth) suitable for grinding is produced by a known method. Blank profile 76 is a substantially flat, elongated body of metal having a tang end 78, a distal tip end 80, a longitudinal back edge 82 and a longitudinal cutting edge 84. Blank profile 76 is secured within a pocket of a slidable fixture (not shown) such that it is oriented with tip end 80 closer to an axis 86 of grinding wheel 74 than tang end 78. Preferably, blank profile 76 is oriented at a 45° angle to axis 86. The fixture is then slid toward grinding wheel 74 in a direction transverse to axis 86 to grind (or mill) a plurality of spaced grooves 88 along cutting edge 84. Blank profile 76 is then rotated so that tang end 78 is closer to axis 86 (again with blank profile 76 preferably at 45° to axis 86), and blank profile 76 is then shifted in a longitudinal direction by a distance of one-half the space between two adjacent grooves 88. The fixture with blank profile 76 is again slid toward grinding wheel 74 to grind a plurality of alternately and oppositely facing slicing teeth having the configurations described above. Diamond roll cutter 70 may of course be used periodically to re-profile annular ridges 72 on grinding wheel 74.

Figure 17:
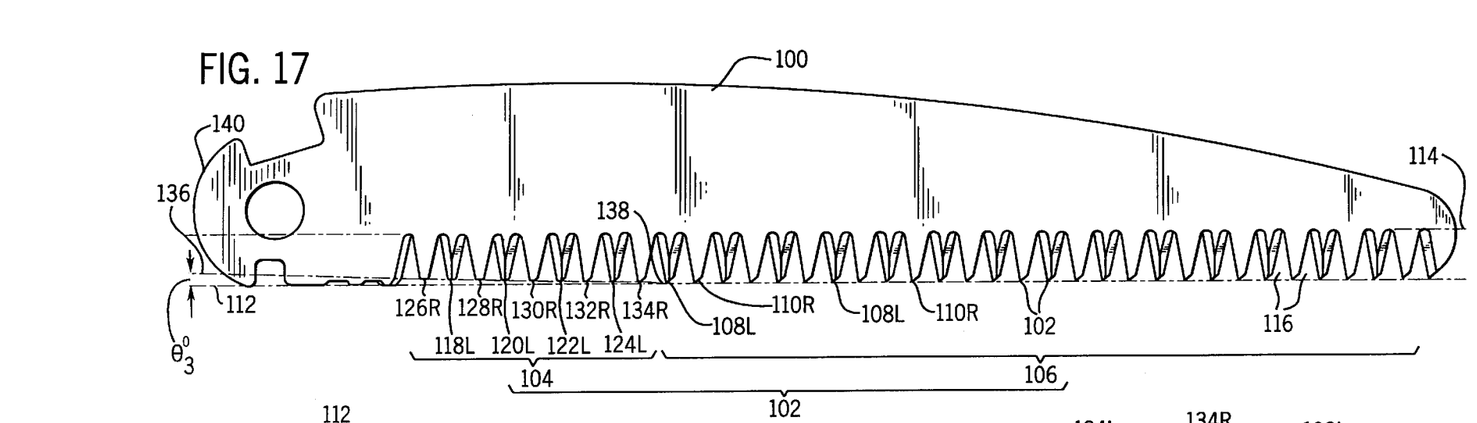
FIG. 17 is a right-side elevational view of a saw blade in accordance with another embodiment of the present invention.
Figure 18:
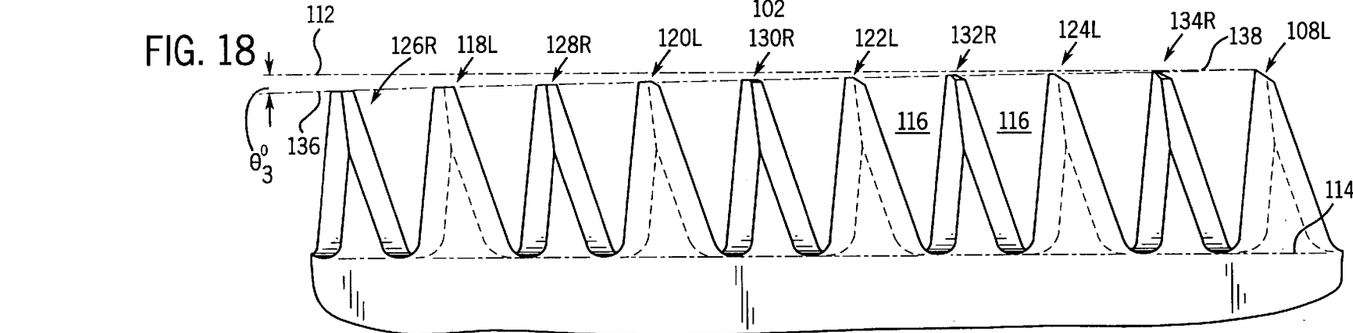
FIG. 18 is an enlarged elevational view of a fragment of the saw blade of FIG. 17, with the blade shown in an inverted position.
Figure 19:
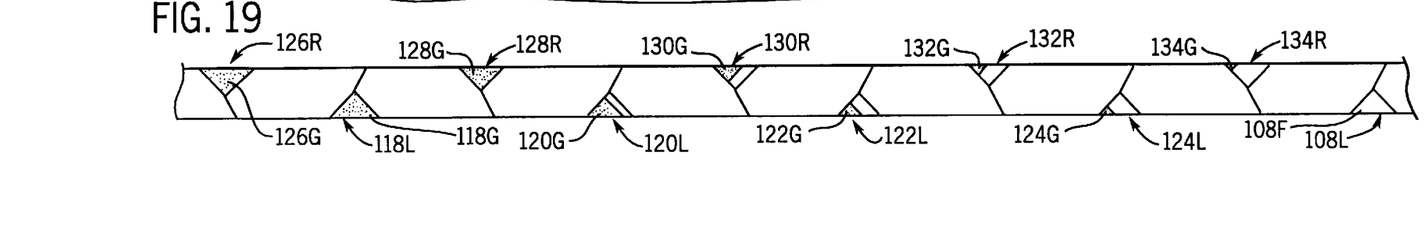
FIG. 19 is a schematic representation of a top view of the saw blade of FIG. 18.

Turning now to FIGS. 17–19, another embodiment of a saw blade 100 provided with slicing teeth 102 including a plurality of low stroke velocity teeth 104 and a plurality of high stroke velocity teeth 106 will now be described. The description of blade 100, however, will be generally limited to aspects thereof which differ from blade 12 as described above (and illustrated in FIGS. 1–15), with the remaining aspects otherwise being substantially the same. High velocity teeth 106 include alternating left and right teeth 108L, 110R which preferably have profiles substantially similar to respective left and right high velocity teeth 58L, 56R described above with reference to blade 12, and thus will not be further described. Each high velocity tooth 108L, 110R has a respective substantially triangular tip face 108F, 110F substantially tangent to a tooth tip tangent line 112. Tangent line 112 is substantially parallel to a teeth base tangent line 114 which is tangent to a plurality of gullets 116 formed between slicing teeth 102.

Low velocity teeth 104 include a plurality of left teeth 118L, 120L, 122L, 124L disposed in an alternating series with a plurality of right teeth 126R, 128R, 130R, 132R, 134R. Each low velocity tooth 118L, 120L, 122L, 124L, 126R, 128R, 130R, 132R, 134R has a low velocity triangular tip face 118G, 120G, 122G, 124G, 126G, 128G, 130G, 132G, 134G which is coextensive with a tooth tip tangent line 136 which diverges from tooth tip tangent line 112 at a location 138 intermediate low velocity teeth 104 and high velocity teeth 106. As clear from the Figures, tangent line 136 diverges from tangent line 112 at a small angle $\theta_3°$ (between about 0° and 5°, and preferably between about 1° and 2° for the illustrated embodiment), so that low velocity teeth 104 have gradually decreasing heights from tooth 134R to tooth 126R. In addition, low velocity triangular tip faces 134G, 124G, 132G, 122G, 130G, 120G, 128G, 118G, 126G have surface areas which continue to increase from with the progression of teeth from tooth 134R to tooth 126R (that is, toward a tang end 140 of blade 100).

Saw blade 100 may of course be made by the method described above with reference to FIG. 16. However, blade 100 may also be easily made by an alternative method which will now be described. The alternative method of making blade 100, however, will be generally limited to steps thereof which differ from the above described method, the remaining steps otherwise being substantially the same. Initially, the diamond roll cutting and grinding processes described above are used to provide a blade having low and high velocity teeth of the same or similar configuration (that is, with all the triangular tip faces at the about the same angle). Subsequently, a grinding operation is used to provide the tips of the low velocity teeth with triangular tip faces thereon having less of an incline with respect to the tip tangent line than the original tip faces.

Experiment

Figure 20:
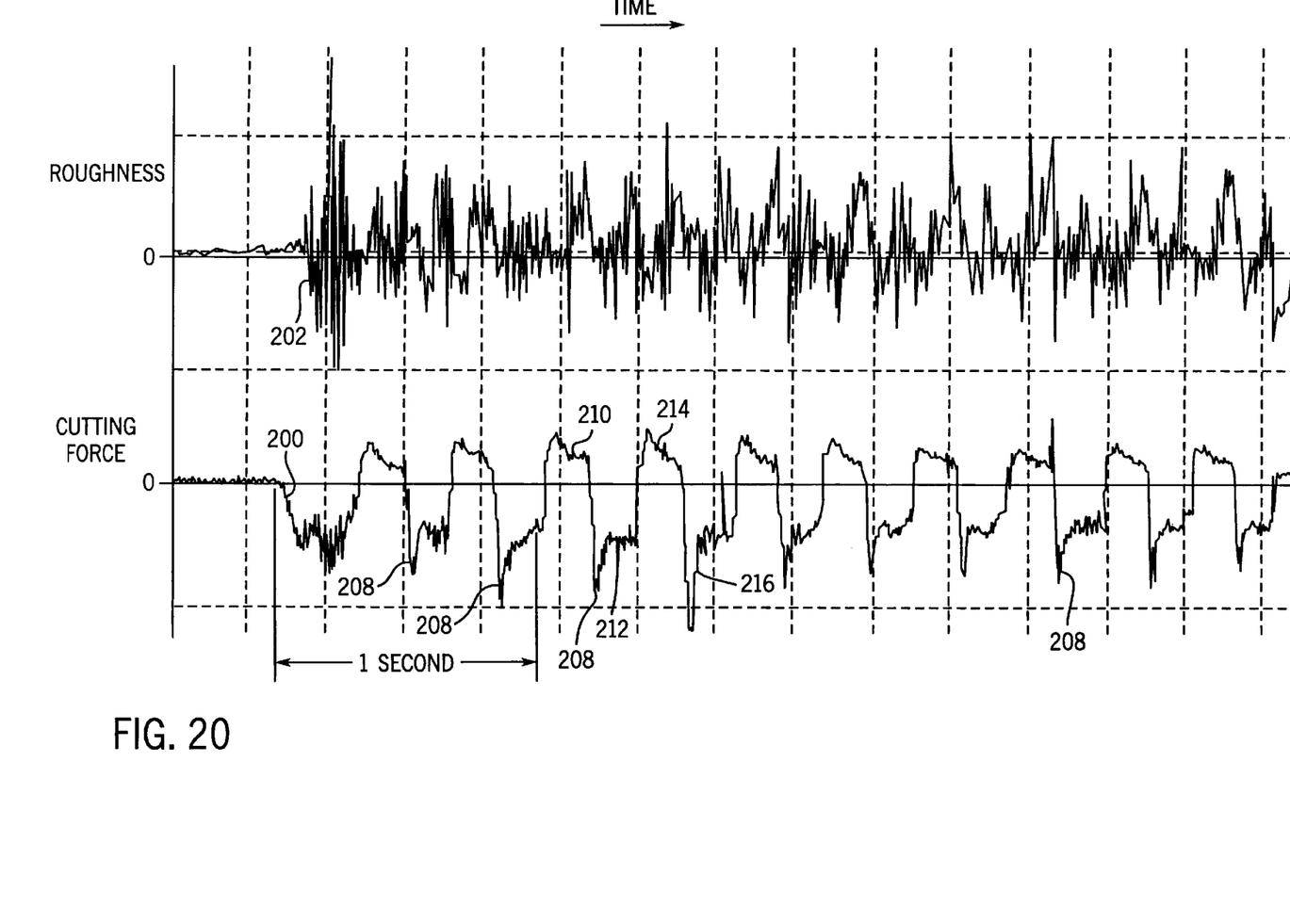
FIG. 20 is a graph plot of the roughness and contemporaneous cutting force generated in an unmodified saw blade.
Figure 23:
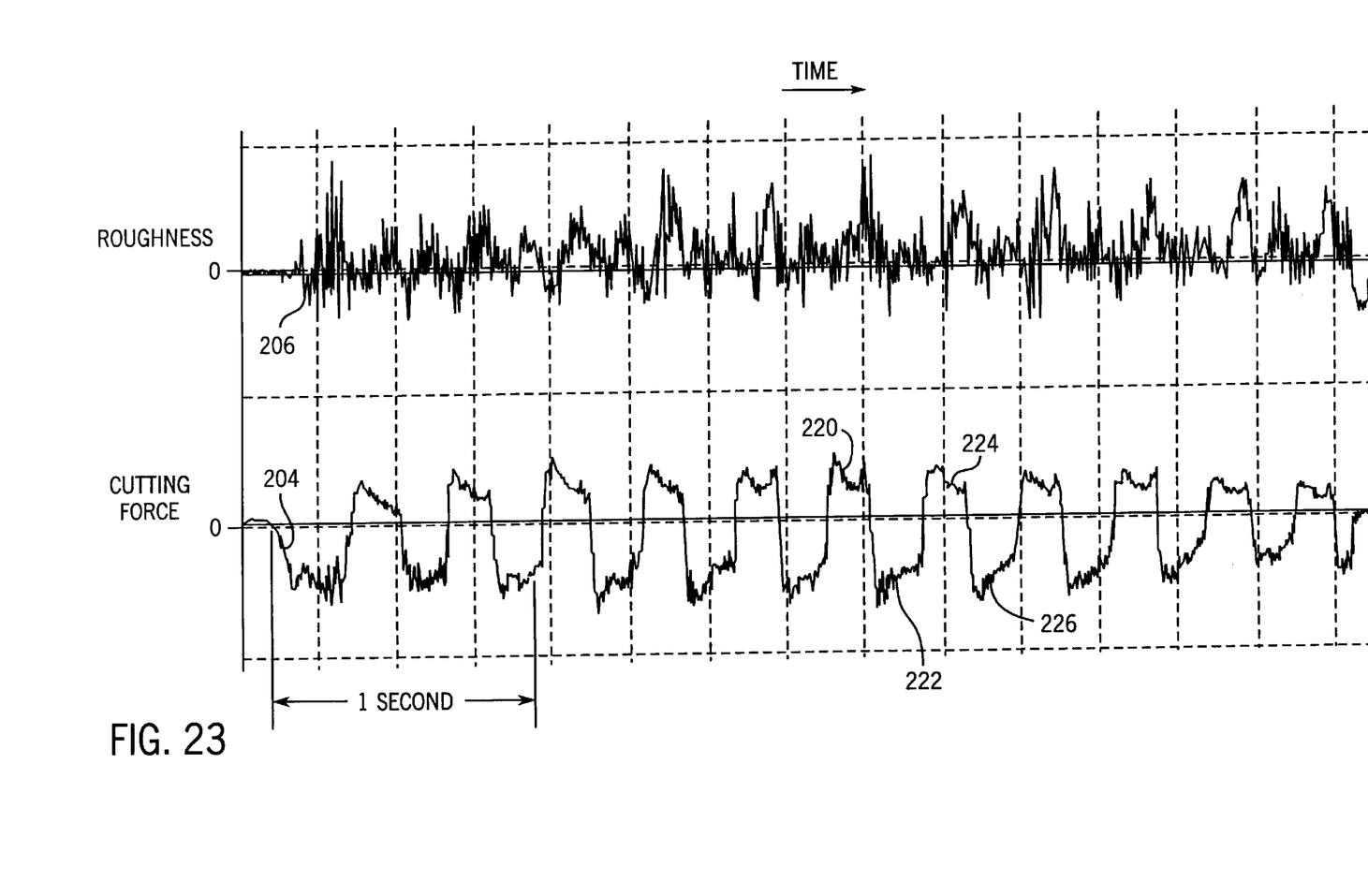
FIG. 23 is a graph plot of the roughness and contemporaneous cutting force generated in a saw blade modified in accordance with the invention.

Two sawing operations were carried out on a 2"×2" spruce board to evaluate the performance of blade 100 against a substantially identical blade, but without the modifications to the low velocity teeth in accordance with the present invention. In all other respects, however, the conditions and parameters of the evaluations were maintained substantially the same during the two sawing operations, the most important of these being stroke velocity and downward pressure applied to the saw blade. Turning first to FIG. 20, a plotted line 200 shows the cutting force of the unmodified blade during the 11 strokes needed to saw through the spruce board, and a plotted line 202 shows the contemporaneous acceleration (that is, roughness or up/down jump) in the unmodified blade. Comparing to FIG. 23, plotted line 204 shows the cutting force blade 100 modified in accordance with the present invention during the 12 strokes needed to saw through the same spruce board, and a plotted line 206 of the contemporaneous acceleration (that is, roughness or up/down jump) in modified blade 100. As shown by the graphs, the unmodified blade exhibited relatively large initial cutting force spikes 208 at the start of each pulling motion, which caused a rougher stroke throughout the remainder of the pulling motion (as shown by the larger amplitude of plotted line 202 compared to plotted line 206).

Figure 21:
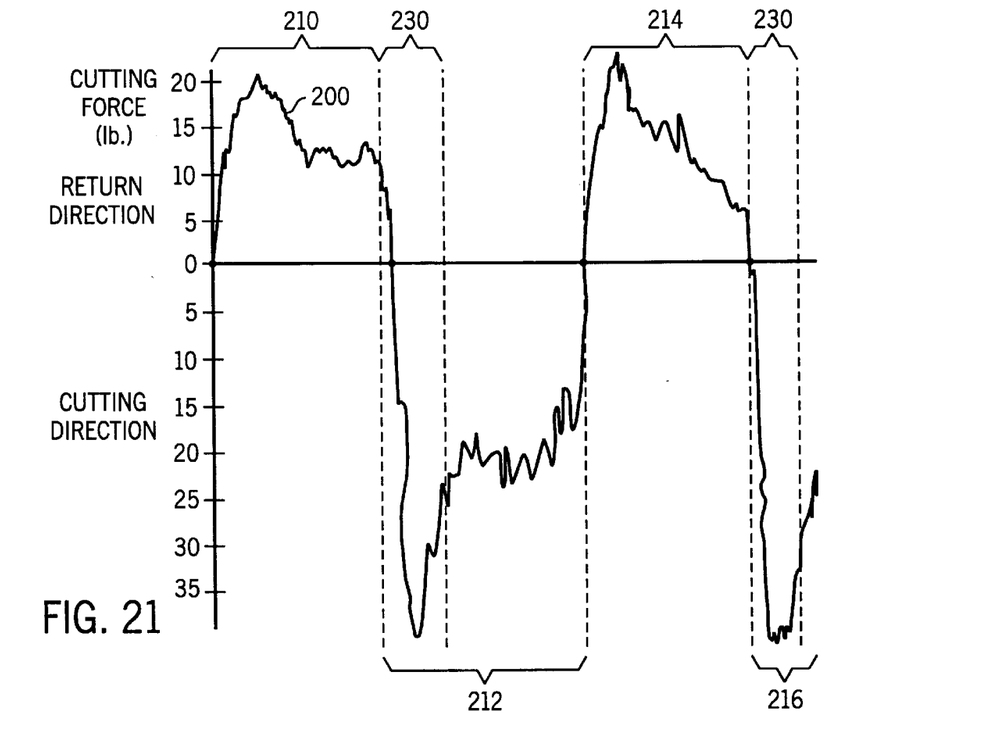
FIG. 21 is an enlarged view of a portion of the graph of FIG. 20 showing the cutting force.
Figure 22:
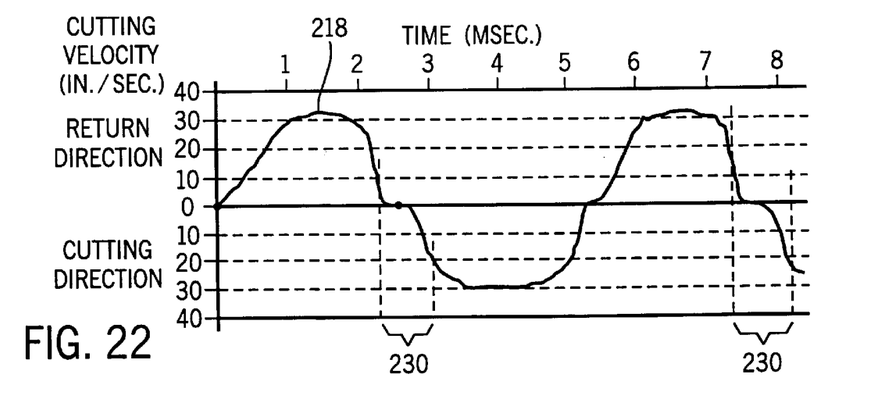
FIG. 22 is a graph plot of the cutting velocity of the unmodified saw blade contemporaneous with the cutting force graph of FIG. 21.

A detailed view of a portion of plotted line 200 of FIG. 20 is shown in FIG. 21. In particular, FIG. 21 shows an initial pushing (or return) motion 210, followed by a pulling (or slicing) motion 212, then another pushing motion 214, and finally another pulling motion 216. FIG. 22 shows a plotted line 218 of the velocity of the unmodified blade in inches/second contemporaneous to the pushing and pulling motions 210, 212, 214, 216 of plotted line 200. The relatively flat region 230 is indicative of a time period during which the blade essentially has no velocity, that is, before movement of the blade can be reversed from a pulling motion to a pushing motion.

Figure 24:
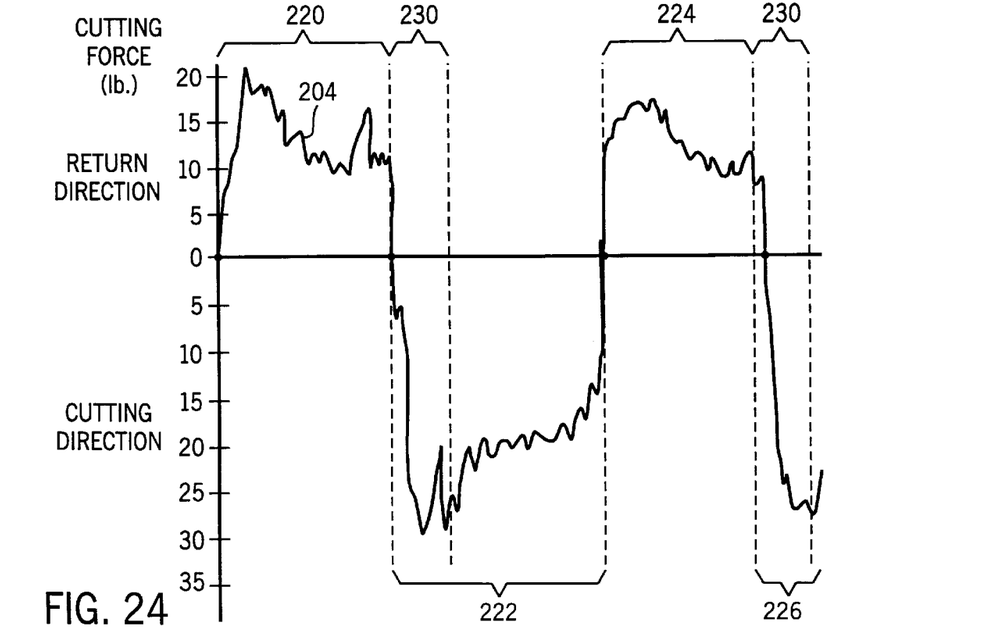
FIG. 24 is an enlarged view of a portion of the graph of FIG. 23 showing the cutting force.
Figure 25:
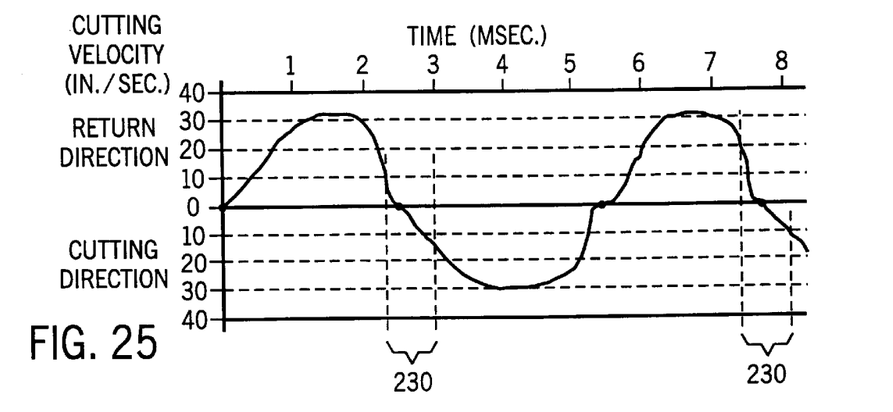
FIG. 25 is a graph plot of the cutting velocity of the modified saw blade contemporaneous with the cutting force graph of FIG. 24.

Similarly, FIG. 24 shows a detailed view of a portion of plotted line 204 including an initial pushing (or return) motion 220, followed by a pulling (or slicing) motion 222, then another pushing motion 224, and finally another pulling motion 226. Likewise, FIG. 25 shows a plotted line 228 of the velocity of blade 100 in inches/second contemporaneous to the pushing and pulling motions 220, 222, 224, 226 of plotted line 204. Noticeably, region 230 no longer shows a period during which the velocity of the blade drops down to zero for a significant period of time.

Figure 26:
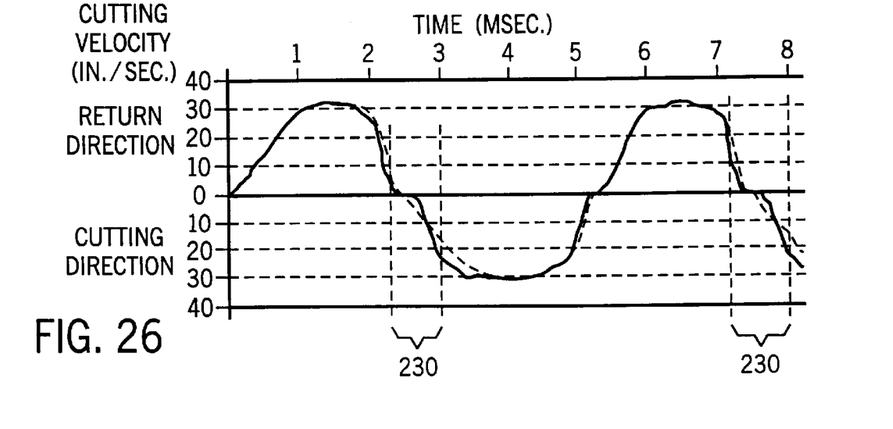
FIG. 26 is a comparison graph of the cutting velocity curves generated in the unmodified and modified blades shown in FIGS. 22 and 25, respectively.

We now turn to FIG. 26 for a comparison of the cutting velocities of the unmodified blade (solid line) and blade 100 (dashed line). As illustrated in FIG. 26, blade 100, modified in accordance with the present invention, exhibits a noticeably smoother acceleration and deceleration during a lower stroke velocity portion 230 of each stroke. Stated another way, the cutting motion using modified blade 100 will be smoother since the velocity remains essentially constant at the point of reversal of the pulling motion into a pushing motion.

Although a variety of embodiments have been described herein, it should be understood that the above description is of preferred exemplary embodiments of the present invention, and that the invention is not limited to the specific forms described. For example, the tooth tip tangent line could be an inwardly or outwardly bowed continuous arc or even have an irregular form (rather than linear as illustrated above), and still offer the advantages described herein. In addition, the slicing teeth could be of modified shapes or even set, that is, alternately leaning to one side and then the other side of the blade body rather than being coplanar as illustrated. Such other constructions are, nevertheless, considered within the scope of this invention. Accordingly, these and other substitutions, modifications, changes and omissions may be made in the design and arrangement of the elements and in their method of operation as disclosed herein without departing from the scope of the appended claims.

What is claimed is:

1. A reciprocating saw blade, comprising:
   an elongated substantially flat member having a first end and a distal second end, a longitudinal back edge and a longitudinal cutting edge; and
   a plurality of alternately and oppositely facing slicing teeth defining a plurality of gullets therebetween, the plurality of slicing teeth comprising a first plurality of slicing teeth extending a predetermined distance from the first end toward the second end and merging into a second plurality of slicing teeth extending to the second end, each slicing tooth of
   the plurality of slicing teeth comprising:
   a tip including an uppermost planar surface;
   a slicing face facing the first end and extending from the tip to a respective bottom of one of the gullets; and
   a planing face facing the second end and extending from the tip to a respective bottom of another of the gullets;
   wherein the tips of the second plurality of teeth define a first tooth tip tangent line and each of the uppermost planar surfaces of the second plurality of teeth

9 lies at an incline angle relative to the first tooth tip tangent line, and further wherein each of the uppermost planar surfaces of the first plurality of teeth lies at a smaller angle relative to the first tooth tip tangent line than each of the incline angles.

2. The reciprocating saw blade of claim 1, wherein the slicing teeth are substantially coplanar with the substantially flat member.

3. The reciprocating saw blade of claim 1, wherein the first end is a tang end and the second end is a tip end.

4. The reciprocating saw blade of claim 3, wherein the tip end includes a longitudinal extension having a longitudinal edge which is generally aligned with the cutting edge and non-serrated.

5. The reciprocating saw blade of claim 1, wherein the first plurality of teeth comprise between about 15% and 35% of the plurality of slicing teeth.

6. The reciprocating saw blade of claim 5, wherein the first plurality of teeth comprise about 25% of the plurality of slicing teeth.

7. The reciprocating saw blade of claim 1, wherein the first plurality of teeth are of substantially equal height with the second plurality of teeth and the tips of the first plurality of teeth are substantially tangent to the first tooth tip tangent line.

8. The reciprocating saw blade of claim 1, wherein the first plurality of teeth gradually decrease in height from the second plurality of teeth toward the first end.

9. The reciprocating saw blade of claim 8, wherein the tips of the first plurality of teeth are substantially tangent to a second tooth tip tangent line which intersects the first tooth tip tangent line at a point between the first and second plurality of teeth.

10. The reciprocating saw blade of claim 1, wherein the substantially flat member has a slight narrowing taper from the cutting edge to the back edge.

11. The reciprocating saw blade of claim 1, wherein the gullets are substantially tangent to a tooth base tangent line which is substantially parallel to the first tooth tip tangent line.

12. The reciprocating saw blade of claim 11, wherein the first tooth tip tangent line and the tooth base tangent line are substantially straight lines.

13. The reciprocating saw blade of claim 1, wherein the first tooth tip tangent line is a substantially straight line.

14. The reciprocating saw blade of claim 1, wherein the blade is made of metal.

15. The reciprocating saw blade of claim 1, wherein the tips of the plurality of slicing teeth essentially lie along a line forming the cutting edge.

16. A reciprocating saw blade, comprising:
an elongated member having substantially planar right and left sides, a tang end and a distal tip end, a back edge and a spaced apart cutting edge; and
a plurality of alternately and oppositely facing slicing teeth, each slicing tooth having a tip, the slicing teeth including a plurality of low velocity teeth extending a predetermined distance from one of the ends toward the other end and a plurality of high velocity teeth extending from the low velocity teeth toward the other end, the high velocity teeth being of substantially equal height and having tips substantially tangent to a first tooth tip tangent line, each slicing tooth having a pair of inclined faces extending from one of the sides and intersecting along an apex of the tooth extending to the tip, each tip of the high velocity teeth including a third inclined face lying at an incline angle relative to the

10 first tooth tip tangent line, each tip of the low velocity teeth including a third inclined face lying at an angle relative to the first tooth tip tangent line which is less than each of the incline angles.

17. The reciprocating saw blade of claim 16, wherein the one end is the tang end and the other end is the tip end.

18. The reciprocating saw blade of claim 16, wherein the low velocity teeth comprise between about 15% and 35% of the plurality of slicing teeth.

19. The reciprocating saw blade of claim 18, wherein the low velocity teeth comprise about 25% of the plurality of slicing teeth.

20. The reciprocating saw blade of claim 16, wherein the low velocity teeth are of substantially equal height with the high velocity teeth and have tips substantially tangent to the first tooth tip tangent line.

21. The reciprocating saw blade of claim 16, wherein low velocity teeth decrease in height from the high velocity teeth to the one end.

22. The reciprocating saw blade of claim 21, wherein the low velocity teeth have tips substantially tangent to a second tooth tip tangent line which intersects the first tooth tip tangent line at a location between the high velocity teeth and the low velocity teeth, and wherein the tangent lines are substantially straight lines.

23. The reciprocating saw blade of claim 16, wherein the substantially planar left and right sides of the member converge slightly from the cutting edge to the back edge to reduce friction with a workpiece being cut.

24. The reciprocating saw blade of claim 16, further including a plurality of gullets, each of the gullets being formed between adjacent slicing teeth, and wherein the gullets are of about equal size.

25. The reciprocating saw blade of claim 24, wherein the gullets are substantially tangent to a tooth base tangent line which is substantially parallel to the first tooth tip tangent line.

26. The reciprocating saw blade of claim 25, wherein the first tooth tip tangent line and the tooth base tangent line are substantially straight lines.

27. The reciprocating saw blade of claim 16, wherein the first tooth tip tangent line is a substantially straight line.

28. The reciprocating saw blade of claim 16, wherein the first tooth tip tangent line is curved inwardly relative to the back edge.

29. The reciprocating saw blade of claim 16, wherein the first tooth tip tangent line is curved outwardly relative to the back edge.

30. A saw for severing materials by reciprocating strokes of the saw, comprising:
a handle;
an elongated blade joined to the handle, the blade having substantially planar right and left sides, a tang end affixed to the handle and a distal tip end, a back edge and a cutting edge; and
a plurality of alternately and oppositely facing slicing teeth defining a plurality of gullets therebetween, the plurality of slicing teeth comprising a plurality of low velocity teeth extending a predetermined distance from the one of the ends toward the other end and merging into a plurality of high velocity teeth extending to the other end, each slicing tooth of the plurality of slicing teeth comprising:
a tip including an uppermost planar surface;
a slicing face facing the one end and extending from the tip to a respective bottom of one of the gullets; and
a planing face facing the other end and extending from the tip to a respective bottom of another of the gullets;

wherein the tips of the plurality of high velocity teeth define a first tooth tip tangent line and each of the uppermost planar surfaces of the plurality of high velocity teeth lies at an incline angle relative to the first tooth tip tangent line, and further wherein each of the uppermost planar surfaces of the plurality of low velocity teeth lies at a smaller angle relative to the first tooth tip tangent line than each of the incline angles.

31. The reciprocating saw of claim 30, wherein the one end is the tang end and the other end is the tip end.

32. The reciprocating saw of claim 31, wherein the low velocity teeth comprise between about 15% and 35% of the plurality of slicing teeth.

33. The reciprocating saw of claim 32, wherein the low velocity teeth comprise about 25% of the plurality of slicing teeth.

34. The reciprocating saw of claim 30, wherein the low velocity teeth are of substantially equal height with the high velocity teeth and the tips of the low velocity teeth are substantially tangent to the first tip tangent line.

35. The reciprocating saw of claim 30, wherein the low velocity teeth gradually decrease in height from the high velocity teeth to the one end.

36. The reciprocating saw of claim 30, wherein the uppermost planar surfaces of the low velocity teeth increase in size from the high velocity teeth to the one end.

37. The reciprocating saw of claim 30, wherein the substantially planar left and right sides of the blade converge slightly from the cutting edge to the back edge to reduce friction with a workpiece being cut.

38. The reciprocating saw of claim 30, wherein the gullets of the low and high velocity teeth are of about equal size.

39. The reciprocating saw of claim 30, wherein the gullets are substantially tangent to a tooth base tangent line which is substantially parallel to the first tooth tip tangent line.

40. The reciprocating saw of claim 39, wherein the tooth tip tangent line is a substantially straight line.

41. A reciprocating saw blade, comprising:
an elongated substantially flat member having a first end and a distal second end, a longitudinal back edge and a longitudinal cutting edge; and
a plurality of alternately and oppositely facing slicing teeth defining a plurality of gullets therebetween, the plurality of slicing teeth comprising a first plurality of slicing teeth extending a predetermined distance from the first end toward the second end and merging into a second plurality of slicing teeth extending to the second end, each slicing tooth of the plurality of slicing teeth comprising:
a tip including an uppermost planar surface;
a slicing face facing the first end and extending from the tip to a respective bottom of one of the gullets; and
a planing face facing the second end and extending from the tip to a respective bottom of another of the gullets;
wherein the tips of the second plurality of teeth define a first tooth tip tangent line, each of the uppermost planar surfaces of the second plurality of teeth lies at an angle relative to the first tooth tip tangent line of between about 25° and 35°, and further wherein each of the uppermost planar surfaces of the first plurality of teeth lies at an angle relative to the first tooth tip tangent line of between about 0° and 5°.

42. The reciprocating saw blade of claim 41, wherein each of the uppermost planar surfaces of the second plurality of teeth lies at an angle relative to the first tooth tip tangent line of about 30°, and further wherein each of the uppermost planar surfaces of the first plurality of teeth lies at an angle relative to the first tooth tip tangent line of about 2°.

* * * * *